(12) United States Patent
Johns et al.

(10) Patent No.: US 6,592,357 B1
(45) Date of Patent: Jul. 15, 2003

(54) ROTATING INERTIAL PIN BLANK STOPS FOR PRESSWARE DIE SETS

(75) Inventors: Albert D. Johns, Saylorsburg, PA (US); Mark B. Littlejohn, Appleton, WI (US); Mircea T. Sofronie, Easton, PA (US)

(73) Assignee: Fort James Corporation, Deerfield, IL (US)

( * ) Notice: Subject to any disclaimer, the term of this patent is extended or adjusted under 35 U.S.C. 154(b) by 296 days.

(21) Appl. No.: 09/653,577

(22) Filed: Aug. 31, 2000

Related U.S. Application Data
(60) Provisional application No. 60/153,168, filed on Sep. 9, 1999.

(51) Int. Cl.[7] .............................................. B29C 51/00
(52) U.S. Cl. ...................................... 425/397; 425/400
(58) Field of Search ............................... 425/400, 397, 425/150

(56) References Cited

U.S. PATENT DOCUMENTS

| | | | |
|---|---|---|---|
| 4,435,143 A | 3/1984 | Dempsey | 425/150 |
| 4,609,140 A | 9/1986 | Van Handel et al. | 229/2.5 R |
| 4,721,500 A | 1/1988 | Van Handel et al. | 493/152 |
| 4,755,128 A | 7/1988 | Alexander et al. | 425/292 |
| 4,778,439 A | 10/1988 | Alexander | 493/169 |
| 4,781,566 A * | 11/1988 | Rossi et al. | 425/400 |
| 4,832,676 A | 5/1989 | Johns et al. | 493/152 |
| 5,041,071 A | 8/1991 | Reasinger et al. | 493/167 |
| 5,129,874 A * | 7/1992 | Hayes, III et al. | 425/400 |
| 5,249,946 A | 10/1993 | Marx | 425/142 |

FOREIGN PATENT DOCUMENTS

JP 2000-37746 * 8/2000

* cited by examiner

*Primary Examiner*—Robert Davis
*Assistant Examiner*—Thu Khanh T. Nguyen
(74) *Attorney, Agent, or Firm*—Michael W. Ferrell

(57) ABSTRACT

In an apparatus for manufacturing pressware containers from container blanks there is provided a plurality of inertial blank stop pins disposed so as to position a container blank prior to press forming. The stop pins are rotatable in order to absorb the kinetic energy of the container blanks as they are fed to the apparatus and eliminate blank bounce. In a further aspect of the invention there is provided a method of forming plates utilizing the improved apparatus including the inertial blank stop pins.

10 Claims, 4 Drawing Sheets

ROTATING INERTIAL PIN BLANK STOPS FOR PRESSWARE DIE SETS

This application claims the benefit of U.S. Provisional Application No. 60/153,168, filed Sep. 9, 1999.

TECHNICAL FIELD

The present invention relates generally to the manufacture of food serving disposable pressware containers from container blanks and more particularly to blank stops disposed on the lower die half of an inclined die set adapted to position a container blank for pressing into a plate, bowl, tray or the like.

BACKGROUND

Disposable pressware containers made from paperboard and so forth, such as plates, trays, bowls and the like are well known in the art. Typically, such articles are manufactured on an inclined die set having upper and lower halves. Illustrative in this regard is U.S. Pat. No. 5,249,946 to Marx assigned to the assignee of the present invention. Referring to the '946 patent, a typical product is manufactured by way of feeding a continuous paperboard web into a cyclically operating blanking section. The forming section includes a plurality of reciprocating upper die halves opposing, in facing relationship, a plurality of lower die halves. The upper die halves are mounted for reciprocating movement in a direction that is oblique or inclined with respect to the vertical plane. The blanks, after cutting, are gravity fed to the inclined lower die halves in the forming section.

Particular forming dies and processes for making pressed paperboard products are likewise well known. Most typically, dies sets for forming paperboard containers, for example, include a male or punch die half and a female die half. Typically, the punch half is reciprocally mounted with respect to its opposing die half and both die halves are segmented. One or more portions of the die halves may be spring-biased if so desired, and the particular geometry of the die will depend upon the product desired. In this regard, there is shown in U.S. Pat. No. 4,832,676 to Johns et al. an apparatus for forming a compartmented paperboard plate. The dies illustrated in the '676 patent includes spring-biased segments as well as pressure rings on the punch half and draw rings of the plate. The particular apparatus further includes articulated, full area knock-outs.

Forming operations can be somewhat critical in order to produce quality product at the desired rates. In this respect, U.S. Pat. No. 4,721,500 to Van Handel et al. is informative. Note also U.S. Pat. No. 4,609,140 to Van Handel et al. The '140 patent provides a general description of one forming method as will be appreciated from FIG. 3 thereof. FIG. 3 shows a cross section of the upper die half and lower die half which are utilized to press a flat, circular paperboard blank into the shape of the plate. The construction of the die halves and the equipment on which they are mounted is substantially conventional; for example, as utilized on presses manufactured by the Peerless Manufacturing Company. To facilitate the holding and shaping of the blank, the die halves are segmented in the manner shown. The lower die has a circular base portion and a central circular platform which is mounted to be moveable with respect to the base. The platform is cam operated in a conventional manner and urged toward a normal position such that it's flat top forming surface is initially above the forming surface of the base. The platform is mounted for sliding movement to the base, with the entire base itself being mounted in a conventional manner on springs. Because the blank is very tightly pressed at the peripheral rim area, moisture in the paperboard which is driven therefrom during pressing and the heated dies cannot readily escape. To allow the release of this moisture, at least one circular groove is provided in the surface of the base which vents to the atmosphere through a passageway. Similarly, the top die half is segmented into an outer ring portion, a base portion and a central platform having a flat forming surface. The base portion has curved, symmetrical forming surfaces and the outer ring has curved forming surfaces. The central platform and the outer ring are slidingly mounted to the base and biased by springs to their normal position shown in FIG. 3 in a commercially conventional manner. The top die half is mounted to reciprocate toward and away from the lower die half. In the pressing operation, the blank is first laid upon the flat forming surface, generally underling the bottom wall portion of the plate to be formed, and the forming surface makes first contact with the top of the blank to hold the blank in place as the forming operation begins. Further downward movement of the top die half brings the spring-biased forming surfaces of the outer ring into contact with the edges of the blank to begin to shape the edges of the blank over the underlying surfaces in the areas which will define the overturned rim of the finished plate. However, because the ring is spring-biased the paperboard material in the rim area is not substantially compressed or distorted by the initial shaping since the force applied by the forming surfaces is generally light and limited to the spring force applied to the ring. Eventually, the top die half moves sufficiently far down so that the platform segments and the ring are fully compressed such that the adjacent portions of the forming surfaces are coplanar. In a conventional manner the die halves are heated with electrical resistance heaters and the temperature of the die halves is controlled to a selected level by monitoring the temperature of the dies with thermistors mounted in the dies as close as possible to the forming surfaces.

For paperboard plate stock of conventional thicknesses in the range of from about 0.010 to about 0.040 inches, it is preferred that the spacing between the upper die surface and the lower die surface decline continuously from the nominal paperboard thickness at the center to a lower value at the rim.

The springs upon which the lower die half is mounted are typically constructed such that the full stroke of the upper die results in a force applied between the dies of from about 6000 to 8000 pounds.

The paperboard which is formed into the blanks is conventionally produced by a wet laid paper making process and is typically available in the form of a continuous web on a roll. The paperboard stock is preferred to have a basis weight in the range of from about 100 pounds to about 400 pounds per 3000 square foot ream and a thickness or caliper in the range of from about 0.010 to about 0.040 inches as noted above. Lower basis weights in caliper paperboard is preferred for ease of forming and to save on feedstock costs. Paperboard stock utilized for forming paper plates is typically formed from bleached pulp furnish, and is usually double clay coated on one side. Such paperboard stock commonly has a moisture (water content) varying from about 4.0 to about 8.0 percent by weight.

The effect of the compressive forces at the rim is greatest when the proper moisture conditions are maintained within the paperboard: at least 8% and less than 12% water by weight, and preferably 9.5 to 10.5%. Paperboard having moisture in this range has sufficient moisture to deform under pressure, but not such excessive moisture that water vapor interferes with the forming operation or that the paperboard is too weak to withstand the high compressive forces applied. To achieve the desired moisture levels within the paperboard stock as it comes off the roll, the paperboard is treated by spraying or rolling on a moistening solution, primarily water, although other components such as lubricants may be added. The moisture content may be monitored with a hand held capacitive type moisture meter to verify that the desired moisture conditions are being maintained. It is preferred that the plate stock not be formed for at least six hours after moistening to allow the moisture within the paperboard to reach equilibrium.

Because of the intended end use of the paper plates, the paperboard stock is typically coated on one side with a liquid proof layer or layers. In addition, for esthetic reasons, the paper plate stock is often initially printed before being coated. As an example of typical coating material, a first layer of polyvinyl acetate emulsion may be applied over the printed paperboard with a second layer of nitrocellulose lacquer applied over the first layer. The plate stock is moistened on the uncoated side after all of the printing and coating steps have been completed. In a typical forming operation, the web of paperboard stock is fed continuously from a roll through a cutting die to form the circular blanks which are then fed into position between the upper and lower die halves. The dies halves are heated as described above, to aid in the forming process. It has been found that best results are obtained if the upper die half and lower die half—particularly the surfaces thereof—are maintained at a temperature in the range of from about 250° F. to about 320° F., and most preferably at about 300° F.±10° F. These die temperatures have been found to facilitate the plastic deformation of paperboard in the rim areas if the paperboard has the preferred moisture levels. At these preferred die temperatures, the amount of heat applied to the blank is apparently sufficient to liberate the moisture within the blank under the rim and thereby facilitate the deformation of the fibers without overheating the blank and causing blisters from liberation of steam or scorching the blank material. It is apparent that the amount of heat applied to the paperboard will vary with the amount of time that the dies dwell in a position pressing the paperboard together. The preferred die temperatures are based on the usual dwell times encountered for normal production speeds of 40 to 60 pressings a minute, and commensurately higher or lower temperatures in the dies would generally be required for higher or lower production speeds, respectively.

As will be appreciated by one of skill in the art, the knock-outs are important for holding the container blank on center during formation and for separating the finished product from the die halves, particularly during high speed operation. The mechanical features can be further augmented pneumatically as is disclosed in U.S. Pat. No. 4,755,128 to Alexander et al.

Another important feature in paperboard press manufacturing of plates, trays, bowls and the like and of particular interest to the present invention is the paper positioning of the paperboard blank in the apparatus. There is disclosed in U.S. Pat. No. 4,435,143 to Dempsey a pressing apparatus for paperboard trays. The apparatus is equipped with blank stops in the form of upstanding members (185, see FIG. 3) that are configured to stop a blank, but to allow a formed container to slide therethrough.

So also U.S. Pat. No. 5,041,071 to Reasinger et al. discloses a paper tray forming machine with a blank centering device which consists of at least 1 finger which is moved upward and toward two passive stops (30 A, 30 B, FIG. 2). The finger may be shaped similarly to the blank edge so that the precise positioning occurs during motion of the fingers.

Likewise, U.S. Pat. No. 4,778,439 to Alexander discloses an apparatus for making paper clam shells including stationary stops 66 (FIGS. 1, 4) and retractable stop pins 60.

Other methods that have been employed (although not believed to be prior art to the present invention) include blank stops of an angular construction in a left and right handed design as discussed further hereinafter. These type of stops can be used for circular, oval, rectangular style plates and trays. The fixed angular blank stops can be shimmed to a range of distances from the center in an attempt to compensate for blank diameter variations, bounce, angled blank transfer chute delivery or blank curl. Blanks gravity fed to the die set will contact the fixed angular stops with significant speed and energy. Blanks will often "bounce back" at least once before settling against the two stops. Sometimes the blanks do not return against one or both of the stops before the cycling die sets form the pressware product. Thus the product is formed off center, having a longer downturned area on one side of the product than the other. This differing downturned area will often reduce product strength. The off center formed products are rejected from die set and are stacked at the end of the conveyor. The stack product can have a non-uniformed appearing edges resulting from random product formation resulting from the blank bounce. Press forming speeds may be limited, especially for larger higher weight products which have more kinetic energy, blank bounce and require more time for final settling.

One possible blank stop technique involves the use of fixed non-rotating pin stops. These stops are easier and less expensive to machine than the fixed angle blank stops. They are tightly bolted to the die half or draw ring and the pin diameters are chosen to center the blank in the forming set. Differing pin diameters can be produced and installed in attempts to compensate for varying blank diameter, blank bounce, angled blank transfer chute delivery or blank curl. A set of two pins per sides (four pins total) may be used towards the front of the die set to stop the product. Four pins can be used to minimize blank damage due to the sudden impact of the blanks against the stops. Blank indenting can result with a non-rotating two or four pin system. Since the pins cannot rotate, the kinetic energy of the gravity fed blanks cannot be absorbed resulting in blank bounce, off center forming a non-uniformed stack product. The fixed non-rotating pin stop system is a lower cost alternative to the fixed angle stop system; however, press forming speeds may be limited with this stop system as well.

Before turning to a more detailed discussion of the present invention, a system utilizing two stationary forward rotating pin stops and two rearward movable rotating pin stops has been used for several years by the assignee of the present invention for production of oval platters. The two rearward rotating pin stops are stroked backward by a pneumatic cylinder for the purposes of positioning an oval blank. This system differs from the system described herein in that the present invention involves two sets of two (four total rotating pin stops) which are located towards the front of the die set. This system is primarily designed for circular blanks and pressware products but may have advantages for other shapes such as ovals, squares, rectangles, and so forth. Oval, square or rectangular products may also require side guides on the die sets. The rotating pin stop system in accordance with the present invention provides utility for matched metal forming of paperboard, plastic, paper plastic composites, etc., for disposable food serving containers.

SUMMARY OF INVENTION

Blanks fed by gravity into the pressware sets that hit against fixed stops whether angular stops or fixed non-rotating pin stops, can rebound/"bounce back" from the stops or contact only one stop and stop prematurely resulting in off center formation of the pressware product. The rotating pin stops in accordance with the present invention absorb the kinetic energy of the blanks and reduce or eliminate blank "bounce". The rotating pin stops also allow the blank to roll or move to an on center position more quickly allowing consistent product formation at higher speeds. The likelihood of contacting one set of rotating pin stops/prematurely stopping is reduced or limited since the blanks will tend to roll or move into an on center position until all rotating pin stops have been contacted. Off center forming of the product can result in lower product strength, improper print design, and product shape esthetics and a non-uniform product stack. Pressware forming speeds can be limited by blanks that "bounce" off the fixed stops or are quickly positioned on center in the forming die set.

The preferred blank stop technique described in detail below, involves the use of four rotating pin blank stops. Two sets of pins located towards the front of the die set absorb the blanks' kinetic energy by spinning/rotating and quickly guiding the blank by rolling or moving it until it contacts all four pins. The two pins of each set which are located more towards the front and center are shorter in some embodiments so that the formed product can be ejected over the top of them without interference. The rotating pin stops may have a flat or angled bottom which contacts against the die set or draw ring. The rotating pin stops may be attached with shoulder bolt screws or in any other manner that will not restrict the pin rotation. Preferably, shoulder bolts are inserted into the pin stops to hide the screw head and prevent blanks from catching on them. The counter bore depth and diameter are sized to allow clearance around the shoulder bolt for free pin rotation. The pin diameters are chosen to center the blank in the forming die set. Differing pin diameters can be produced and installed if necessary to compensate for blank curl. Optionally, the two sets of rotating pins can be mounted to independent components which can be radially shimmed or positioned inwardly or outwardly with a constant pin diameter to center the blank in the forming die set.

In accordance with the present invention there is provided an improved apparatus for manufacturing pressware containers from container blanks having a lower die member for receiving blanks. The improvement includes a blank stop system including at least four rotatably mounted inertial blank stop pins disposed on the forward portion of the lower die member and projecting upwardly therefrom. At least two of the rotatably mounted inertial blank stop pins are outer pins located on the forward portion of the lower die member in opposing relationship to each other at a distance from each other which is less than the maximum transverse dimension of the container blank and which distance is greater than or equal to the maximum transverse dimension of the formed container. At least two of the rotatably mounted inertial blank stop pins are inner pins located on the forward portion of the lower die member, forwardly located with respect to the outer pins. The inner pins are disposed in opposing relationship at a distance which is less than the maximum transverse direction of the container formed from the container blank.

The outer pins project upwardly a greater distance than the inner pins in some preferred embodiments of the present invention. The height and diameter of the pins may vary depending upon the product being made; for example, taller pins may be more appropriate for a bowl. For an 11-inch diameter plate that is about ⅞ inch deep, the outer pins may be anywhere from about ⅞ inch to 1⅛ inch in height, while the inner pins may be anywhere from about ½ to about ¾ inch in height. More generally, in particular embodiments, the outer pins may have a height of from about ½ to about 1½ inches while the inner pins ray have a height of from about ⅛ to about 1 inch in height in particular embodiments. If the formed product is tall enough, the inner and outer pins may all be of the same height. The pins are typically substantially cylindrical with an axial bore to receive a retaining bolt. Even more particularly, the stop pin have a cavity for receiving a bolt head such that the bolt head will secure the pin and not interfere with the operation of the apparatus.

The cylindrical pins may be of any suitable diameter, with anywhere from about ¼ inch to about 1 inch being typical. In some embodiments, pin diameters from about ⅜ to about ¾ inch may be preferred.

While the pin stops may be biased or frictionally engaged by the retaining bolt, most preferably, the pin stops are freely rotating about the retaining bolt.

In another aspect of the invention there is provided a method of making a pressware container from a container blank comprising supplying a blank to a lower die member equipped with a blank stop system comprising at least four rotatably mounted inertial blank stop pins disposed on the forward portion of the lower die member and projecting upwardly therefrom. At least two of the rotatably mounted inertial blank stop pins are outer pins located on the forward portion of the lower die member in opposing relationship to each other at a distance from each other which is less than the maximum transverse dimension of the container blank and which is greater than or equal to the maximum transverse dimension of the formed container. At least two of the rotatably mounted inertial blank stop pins are inner pins located on the forward portion of the lower die member, forwardly located with respect to the outer pins. The inner pins are disposed in opposing relationship at a distance which is less than the maximum transverse direction of the container formed from the container blank. The second step in the process comprises forming the blank into the desired container. Typically the blank is a paperboard blank and has a caliper of from about 0.008 to about 0.05 inches and more preferably from about 0.012 to about 0.025 inches. Generally a preferred moisture content for the blank is from about 8 to about 12% by weight moisture with from about 8.5% to about 10.5% moisture being particularly preferred.

BRIEF DESCRIPTION OF DRAWINGS

The invention is described in detail below with reference to the various figures appended hereto, wherein like numerals designate similar parts.

In the figures.

DETAILED DESCRIPTION

Figure 1:
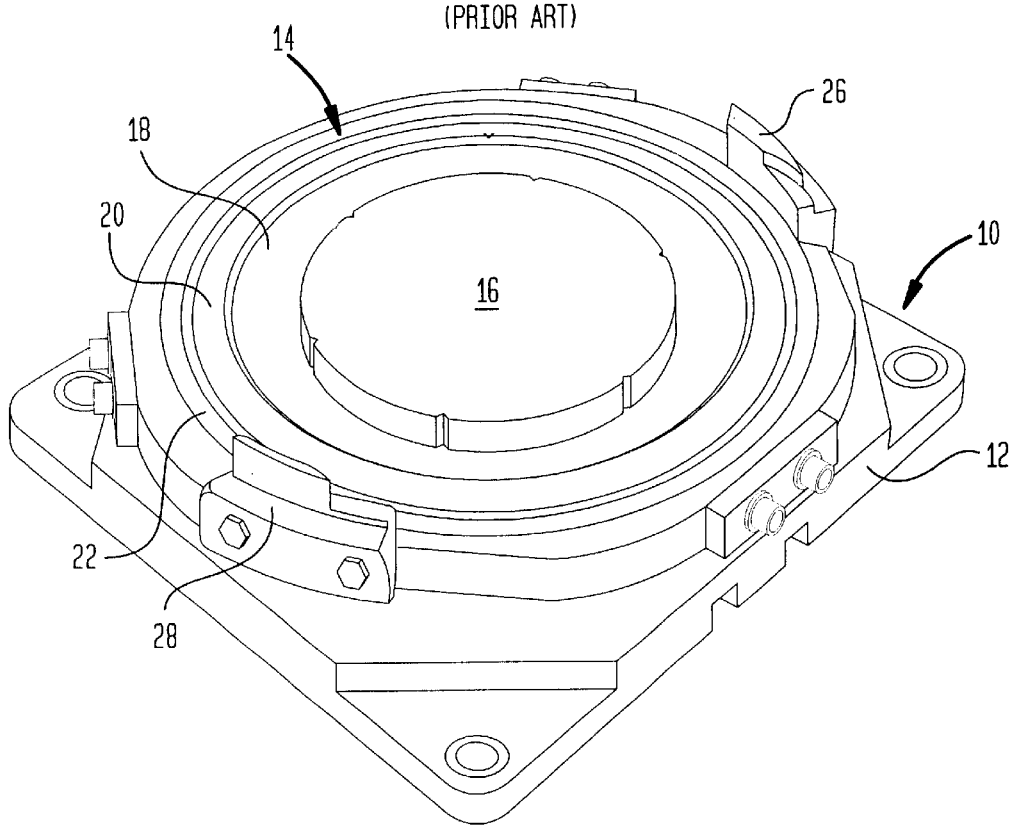
FIG. 1 is a schematic illustration of the lower die half of a conventional die set.
Figure 2:
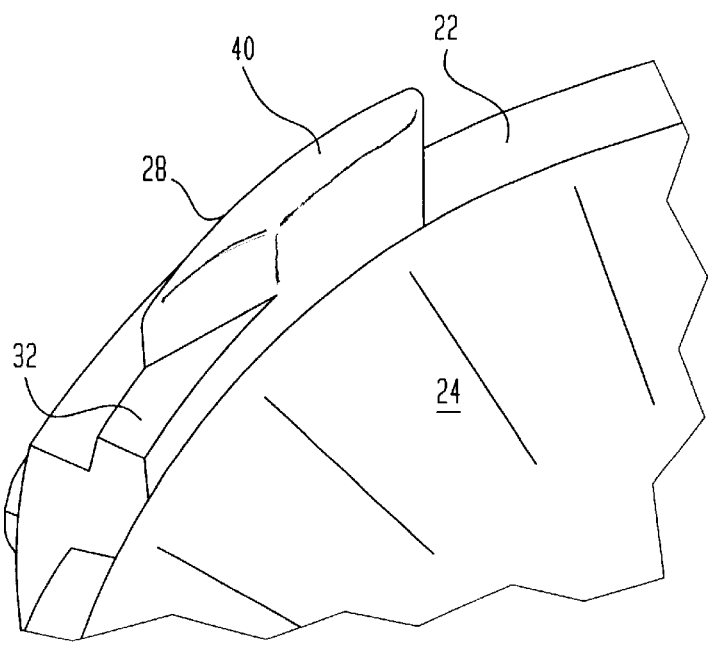
FIG. 2 is a detail of the lower die half of FIG. 1 showing a flat, scored paperboard blank positioned on the lower die half prior to forming.
Figure 3:
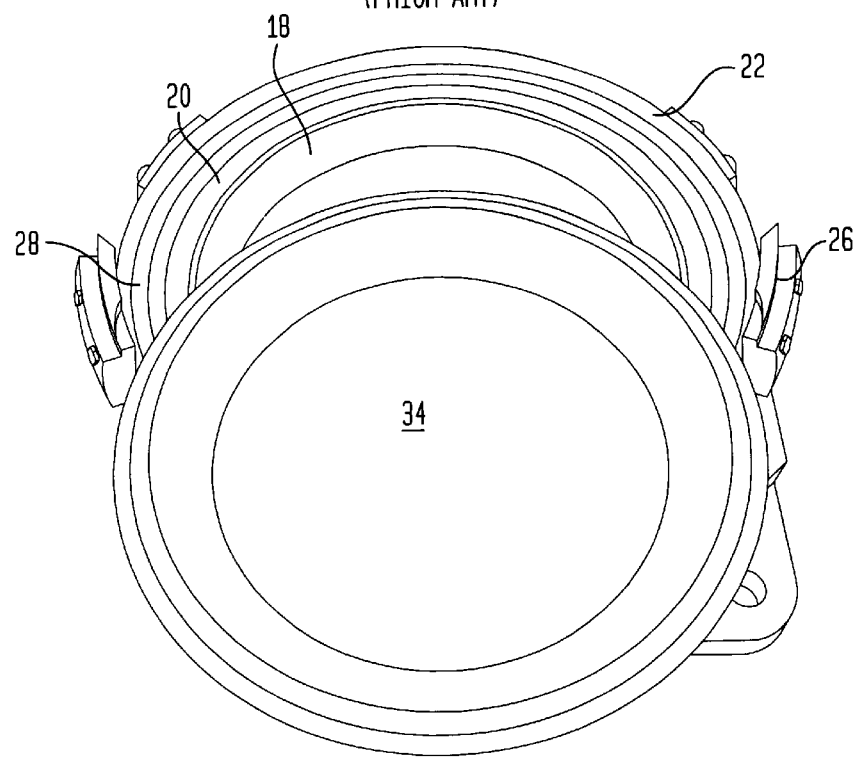
FIG. 3 is a schematic diagram showing a plate manufactured by way of the die of FIG. 1 being ejected past the blank stop.

The present invention is described in detail below with reference to the various figures. Modifications to particular embodiments will be readily apparent to those of skill in the art and the particular embodiments illustrated are in no way intended to limit the invention which is defined in the appended claims. There is shown in FIGS. 1 through 3 a conventional lower die press assembly for making pressed paper products.

Assembly 10 includes a mounting plate 12 which supports a lower segmented die 14. Segmented die 14 includes a full area knock-out ring 16 which is shown extended as it would be into the die cavity. Die 14 is also provided with a side wall forming section 18, a rim forming portion 20 and a draw ring 22. As will be appreciated by one who is skilled in the art, assembly 10 is typically mounted below a punch die in an inclined manner. In use container blanks such as paper blank 24 (FIG. 2) are gravity fed to lower die 14. Paper blanks, such as blank 24, may be scored as shown or unscored. There is shown in FIGS. 1 through 3 a pair of blank stops 26, 28 configured to receive a circular container blank such as container blank 24. Blank stops 26, 28 are termed herein angular blank stops and are right and left handed respectively as will be appreciated from the figures. As can be seen more clearly in FIG. 2, blank stop 28 includes an upper curved portion 40 to conform to the circular blank 24 and an angled portion 32 of lower height to allow the finished product, such as plate 34 to be ejected thereover. Although conventional, with respect to the inertial blank stops of the present invention, stops 26, 28 are not believed to be in the prior art, nor is the positioning system described hereinabove in the background section which notes rotating pins. The devices do not have the advantages of the present invention and are included to illustrate the nature of the positioning problem and prior solutions to the problem. It will be appreciated from FIG. 3 which is a schematic diagram showing a finished plate being ejected over the blank stops 26, 28 that the blank stops are configured such that the angled portion does not interfere with ejection of the finished product. In contrast to prior known methods, the present invention provides for simple construction and operation. Moreover, the freely rotating inertial blank stops of the present invention convert the kinetic energy of a moving blank into rotational energy dissipated frictionally in order to prevent blank bounce and provide for better cycling of the apparatus. The advantages of the present invention are better appreciated from FIGS. 4 through 7.

There is shown in FIGS. 4 through 7 a metal die press 5 including an upper die press assembly 7, commonly referred to as a punch die assembly and a lower die assembly 10 that is discussed in connection with FIGS. 1 through 3. That is, assembly 10 includes a mounting plate 12, a segmented die 14 with a knock-out 16, a side wall forming section 18, a rim forming portion 20 and a draw ring 22. It will be appreciated that metal die press 5 is ordinarily operated in an inclined state in accordance with the following United States Patents, the disclosures of which are hereby incorporated by reference into this application:

U.S. Pat. No. 5,249,946;
U.S. Pat. No. 4,832,676;
U.S. Pat. No. 4,721,500;
U.S. Pat. No. 4,609,140.

Figure 4:
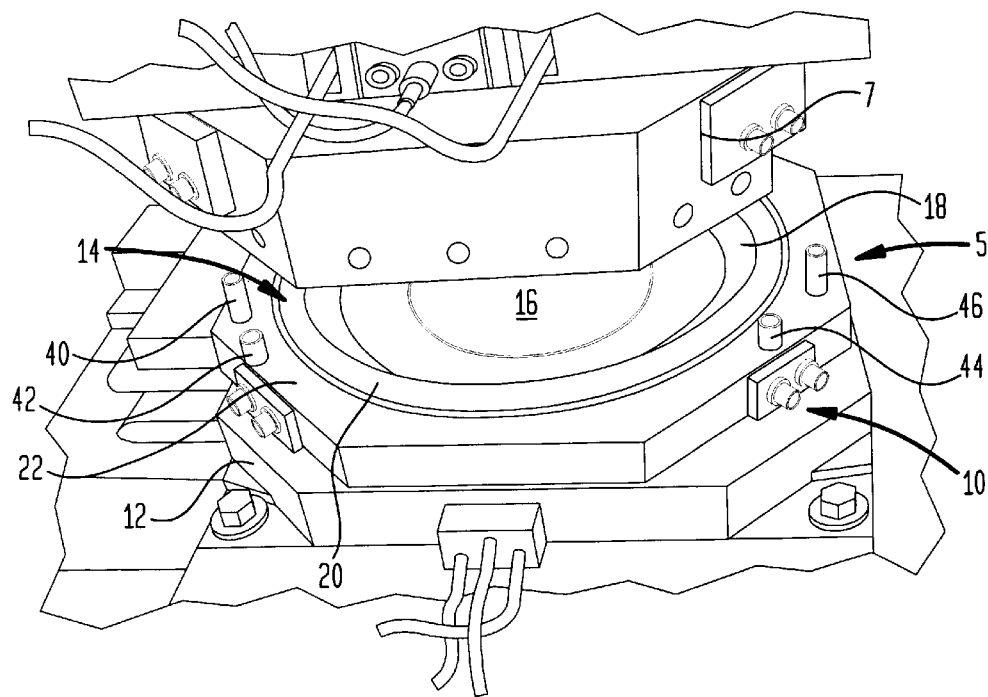
FIG. 4 is a schematic diagram of a forming press showing the blank stop system in accordance with the present invention.
Figure 5:
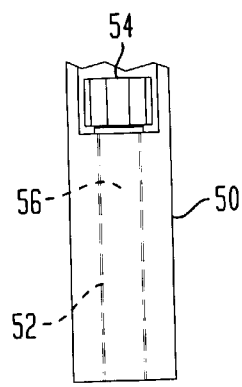
FIG. 5 is a drawing in section of a blank stop and retaining shoulder bolt which can be used in the apparatus of FIG. 4.

An important distinction of one example in the apparatus of the present invention is, however, a plurality of freely rotating stop pins 40, 42, 44 and 46 which may be constructed as shown in FIG. 5. Each pin 40–46 is constructed of steel or other suitable material and includes an elongated shaft 50 as well as a central bore 52. There is additionally provided a "counter bore" cavity 54 for receiving a retaining bolt. Preferably the bolt 56 is recessed within the cavity so that it will not interfere with operation of the apparatus. Bolts, preferably socket head shoulder bolts, are used to secure pins 40–46 to draw ring 22 of segmented die 14 as shown in FIG. 4. The bolts in central bore 52 are close in size to the bore diameter to prevent chatter and horizontal movement of the rotating pin blank stops but enough clearance is preferably allowed so that pins 40–46 are freely rotating about their rotating bolts. If so desired, a slight tension or bias can be provided to damp the motion of rotating pin blank stops 40–46, particularly when very heavy stock is employed in the forming process.

Figure 6:
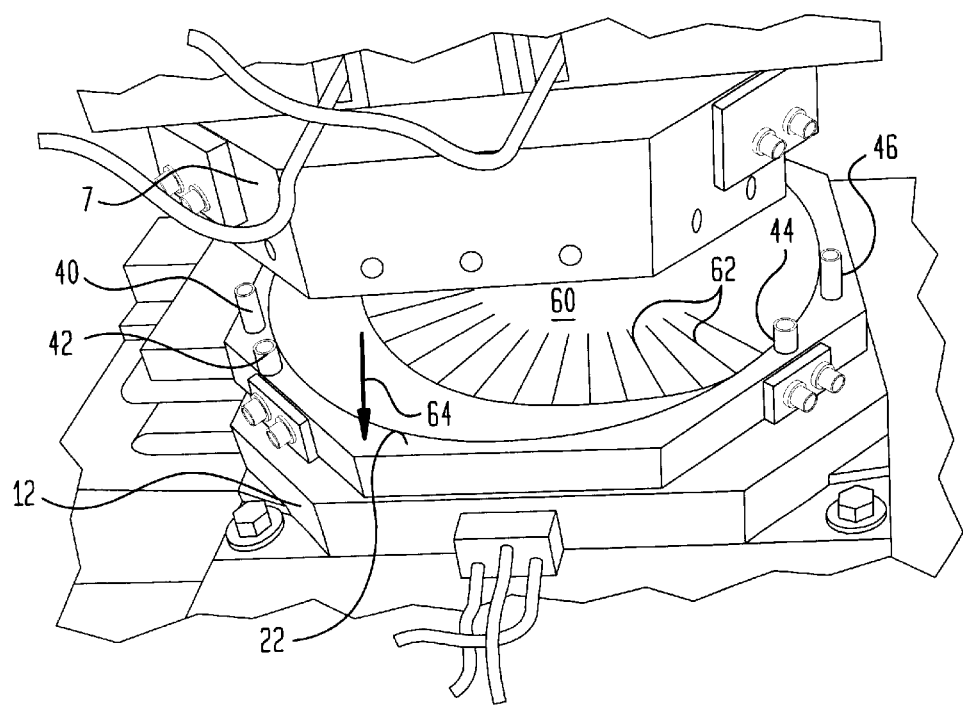
FIG. 6 is a schematic illustration of the apparatus of FIG. 4 showing a scored paperboard blank positioned for forming.

Referring to FIG. 6 there is shown a blank 60 provided with a plurality of scores which are subsequently formed into pleats in the final product. As shown in FIG. 6 it would be appreciated that the rotating pin blank stops 40–46 are located on the forward portion of the lower die 14, that is, the downstream production portion of the die, such that a gravity fed blank, such as blank 60, will contact the blank stops as shown. It could be seen that blanks 40–46 are in opposing relationship at the periphery at the lower die at a distance which is less than the maximum transverse dimension of the blank, in this case the diameter of blank 60 since it is a circular blank and that pins 42 and 44 are also located at a distance which is also less than the diameter of the blank inasmuch as the plate will move in the direction indicated by arrow 64 in the production process, it is important that the rotating pin blank stops do not interfere with the motion of the finished product.

Figure 7:
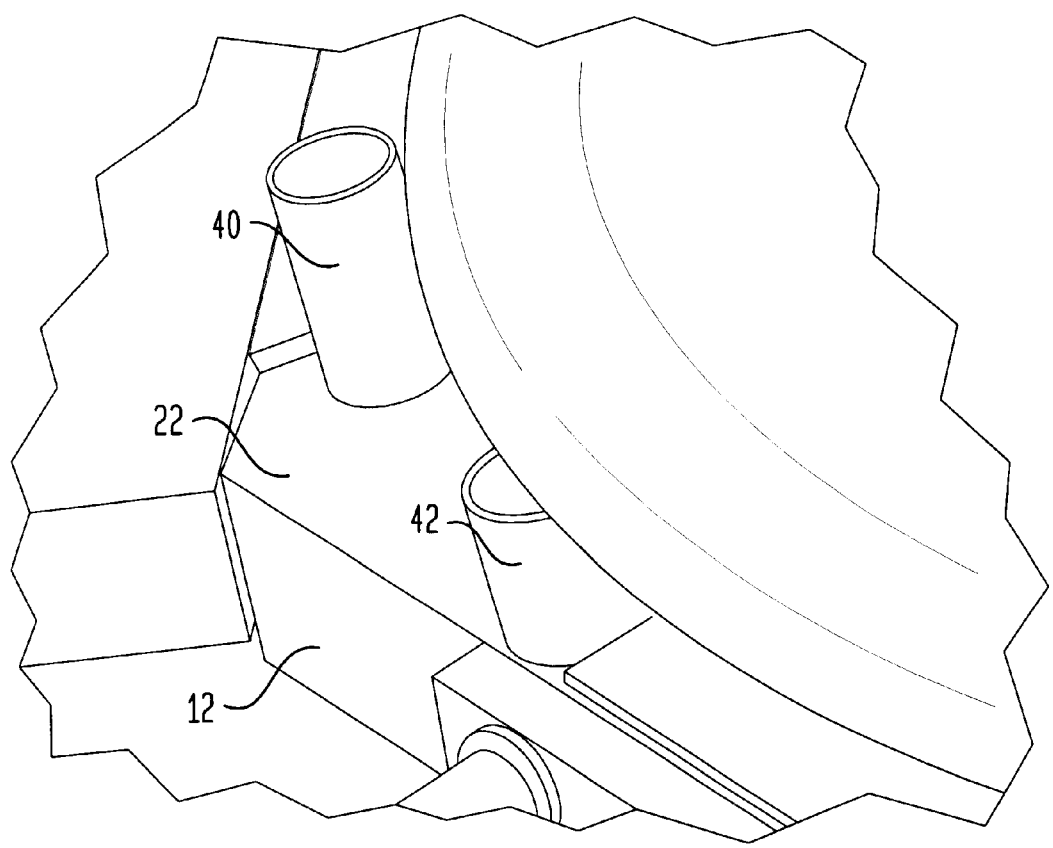
FIG. 7 is a schematic detail of the apparatus of FIG. 4 showing a finished product after forming.

After the blank is positioned as shown in FIG. 6, the top assembly 7 is lowered and the forming process is carried out in a conventional manner and the plate is formed as shown in FIG. 7. It will be appreciated from FIG. 7 that the distances between the outer pin blank stops 40,46 is such that the finished product will readily slide between these pins, i.e., the distance is greater than or equal to the diameter of the finished container. It should also be noted as was further stated in the summary of the invention section above, that the product will travel over pins 42 and 44 which are typically of lower height than pins 40 and 46 and are closer together than the maximum diameter of the finished container.

The invention has been described in detail here and above in connection with a particular embodiment which is not intended to limit in any way the scope of the present invention which is defined in the appended claims.

What is claimed is:

1. In an apparatus for manufacturing pressware containers from container blanks having a lower die member for receiving said container blanks, an improved blank stop system comprising at least four rotatably mounted inertial blank stop pins disposed on the forward portion of the said lower die member with respect to a production direction and projecting upwardly therefrom, at least two of said rotatably mounted inertial blank stop pins being outer pins located on said forward portion of said lower die member with respect to the production direction in opposing relationship to each other at a distance from each other which is less than the maximum transverse dimension of said container blank and which is greater than or equal to the maximum transverse dimension of the formed container, at least two or said rotatably mounted inertial blank stop pins being inner pins located on said forward portion of said lower die member with respect to the production direction, forwardly and inwardly located with respect to said outer pins, said inner pins being disposed in opposing relationship at a distance which is less than the maximum transverse dimension of the container formed from said container blank, said rotatably mounted inertial blank stop pins further being positioned, configured and dimensioned such that the stop pins will contact a blank at the forward portion of the die member as it is fed along the production direction and position the blank for funning as well as allow the formed product to slide between the outer pins and over the inner pins.

2. The improved blank stop system according to claim 1, wherein said outer pins project upwardly a greater distance than said inner pins.

3. The improved blank stop system according to claim 2, wherein said outer pins project upwardly at a height of from about ½ to about 1½ inches and said inner pins project upwardly at a height of from about ⅛ to about 1 inch.

4. The improved blank stop system according to claim 1, wherein said outer and inner pins project upwardly at equal height from said lower die member.

5. The improved blank stop system according to claim 1, wherein said pins are substantially cylindrical are provided with an axial bore configured to receive a retaining bolt.

6. The improved blank stop system according to claim 5, wherein each of said pins is provided with a counterbore cavity for receiving a bolt head.

7. The improved blank stop system according to claim 5, wherein each of said pins has a diameter of from about ¼ to about 1 inch.

8. The improved blank stop system according to claim 7, wherein each of said pins has a diameter of from about ⅜ to about ¾ inches.

9. The improved blank stop system according to claim 1, wherein each of said pins is freely rotatable about a retaining member.

10. In an apparatus for manufacturing pressware containers from container blanks having a lower die member for receiving said container blanks, an improved blank stop system comprising at least four rotatably mounted inertial blank stop pins disposed on the forward portion of the said lower die member with respect to a production direction and projecting upwardly therefrom, the blank stop pins being bolted to the lower die member with a plurality of retaining shoulder bolts, at least two of said rotatably mounted inertial blank stop pins being outer pins located on said forward portion of said lower die member with respect to the production direction in opposing relationship to each other at a distance from each other which is less than the maximum transverse dimension of said container blank and which is greater than or equal to the maximum transverse dimension of the formed container, at least two of said rotatably mounted inertial blank stop pins being inner pins located on said forward portion of said lower die member with respect to the production direction, forwardly and inwardly located with respect to said outer pins, said inner pins being disposed in opposing relationship at a distance which is less than the maximum transverse dimension of the container formed from said container blank, said rotatably mounted inertial blank stop pins further being positioned, configured and dimensioned such that the stop pins will contact a blank at the forward portion of the die member as it is fed along the production direction and position the blank for forming as well as allow the formed product to slide between the outer pins and over the inner pins.

\* \* \* \* \*

UNITED STATES PATENT AND TRADEMARK OFFICE
CERTIFICATE OF CORRECTION

PATENT NO. : 6,592,357 B1  Page 1 of 1
DATED : July 15, 2003
INVENTOR(S) : Albert D. Johns et al.

It is certified that error appears in the above-identified patent and that said Letters Patent is hereby corrected as shown below:

<u>Column 1,</u>
Line 19, change "funning" to -- forming --;

<u>Column 9,</u>
Line 7, change "or" to -- of --; and
Line 33, change "are" to -- and --.

Signed and Sealed this

Fourteenth Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,592,357 B1
DATED : July 15, 2003
INVENTOR(S) : Albert D. Johns et al.

It is certified that error appears in the above-identified patent and that said Letters Patent is hereby corrected as shown below:

<u>Column 1,</u>
Line 36, insert -- . -- after the first instance of "half";
Line 45, change "of" to -- on --;
Line 64, change "it's" to -- its --;

<u>Column 2,</u>
Line 16, change "underling" to -- underlying --;

<u>Column 3,</u>
Line 16, change "esthetic" to -- aesthetic --;

<u>Column 4,</u>
Line 26, insert -- the -- after "from";
Line 27, delete "a";
Line 48, delete "non-uniformed" and insert -- non-uniform --;
Line 60, insert -- pin stops -- after the second instance of "two";

<u>Column 5,</u>
Line 16, delete "/" after "stops";
Line 20, change "esthetics" to -- aesthetics --;

<u>Column 6,</u>
Line 11, change "ray" to -- -may --;

<u>Column 8,</u>
Line 36, insert -- . -- after "blank";
Line 37, change "inasmuch" to -- Inasmuch --; and

UNITED STATES PATENT AND TRADEMARK OFFICE
CERTIFICATE OF CORRECTION

PATENT NO.    : 6,592,357 B1
DATED         : July 15, 2003
INVENTOR(S)   : Albert D. Johns et al.

It is certified that error appears in the above-identified patent and that said Letters Patent is hereby corrected as shown below:

<u>Column 9,</u>
Line 19, change "funning" to -- forming --.

Signed and Sealed this

Ninth Day of December, 2003

JAMES E. ROGAN
*Director of the United States Patent and Trademark Office*